United States Patent [19]

Souther

[11] 3,842,792

[45] Oct. 22, 1974

[54] SEAL WEAR INDICATING MECHANISMS

[76] Inventor: Louis C. Souther, 429 York St., Canton, Mass. 02021

[22] Filed: Sept. 4, 1973

[21] Appl. No.: 394,382

[52] U.S. Cl. .......................................... 116/114 Q
[51] Int. Cl. ........................................ G01d 21/00
[58] Field of Search .............. 116/114 Q; 277/81 P; 418/113, 178

[56] References Cited
UNITED STATES PATENTS

| | | | |
|---|---|---|---|
| 1,662,901 | 3/1928 | Ripley | 116/114 Q |
| 2,102,784 | 12/1937 | Bridges | 116/114 Q |
| 3,056,380 | 10/1962 | White | 116/114 Q |
| 3,752,607 | 8/1973 | Bilobran | 418/113 |
| 3,756,754 | 9/1973 | Sakamaki | 418/113 |

Primary Examiner—Louis J. Capozi
Attorney, Agent, or Firm—Bernard H. Lemlein

[57] ABSTRACT

A mechanism for determining the wear of the apex seals of the rotor of a rotary internal combustion engine consisting of one or more devices incorporated in the wearing surface of the seal which change in appearance with wear of the seal and which may be observed through a spark plug hole or socket of the engine upon the removal of the spark plug normally engaged in said hole or socket and the alignment of said seal with said hole or socket.

9 Claims, 5 Drawing Figures

PATENTED OCT 22 1974 3,842,792

SEAL WEAR INDICATING MECHANISMS

This invention relates to mechanisms for determining the wear of the apex seals of the rotor of a rotary internal combustion engine, for example, the so-called Wankel engine.

It is the main object of the present invention to provide a mechanism of the general character indicated which enables the determination of the wear referred to without the necessity of dismantling the engine.

It is a further object of the present invention to accomplish the foregoing in a speedy, simple and inexpensive manner.

These objects are attained by providing at least one of the apex seals with one or more openings extending from the wearing surface of the seal to varying depths corresponding to different degrees of wear, which openings may or may not be filled with a material which is compatible with the material of the seal and, preferably but not necessarily, of contrasting color to the material of the seal. By removing one of the spark plugs of the engine and observing the openings just referred to the degree of wear to which the seal has been subjected may be observed.

The foregoing and other objects, features and advantages of the present invention will become more apparent as the following detailed description, when taken in connection with the accompanying drawings, progresses.

In said drawings.

Referring now more in detail to the seal wear indicating mechanisms of the present invention, with particular reference to the aforesaid drawings illustrating the same, the numeral 10 generally designates a broken away portion of the rotor housing of a rotary internal combustion engine, for example, the so-called Wankel engine. Said housing is provided in the usual manner with a plurality of threaded spark plug receiving holes or sockets 11 from which, for the purposes of this description, the spark plugs have been removed.

Figure 1:
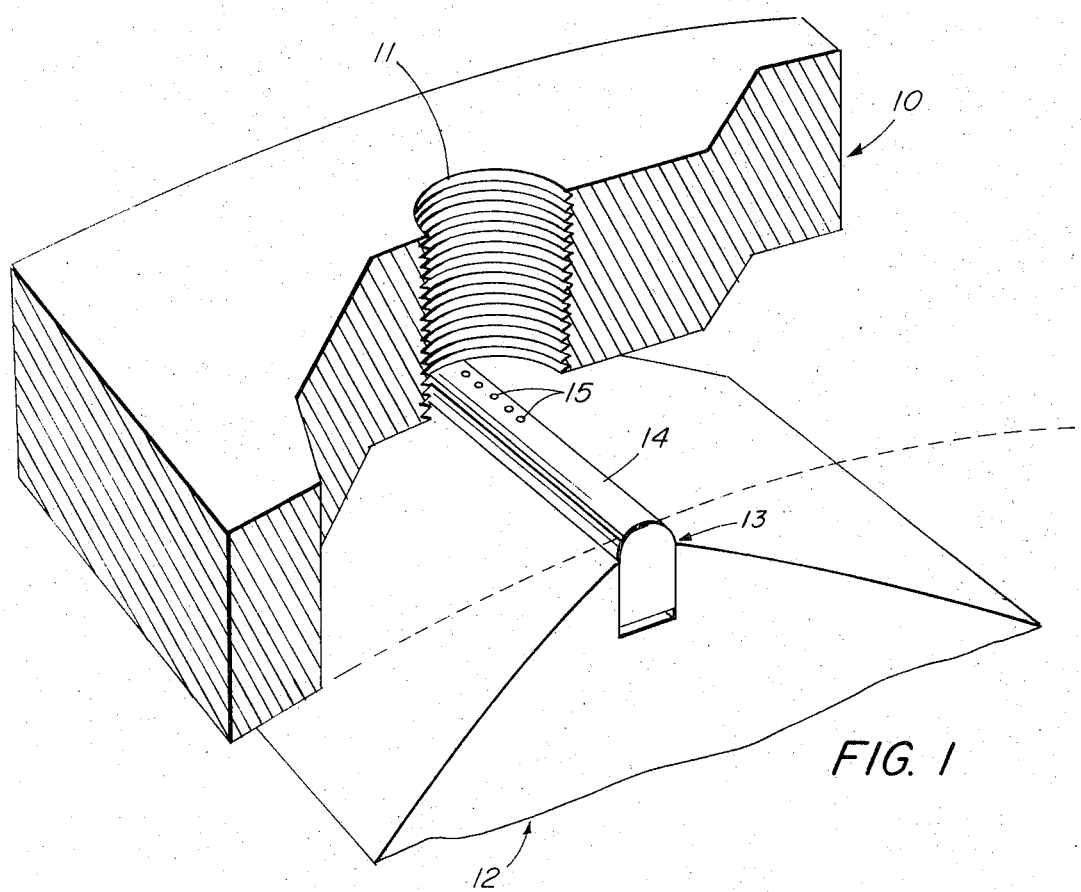
FIG. 1 is a perspective view, partially in section, of a portion of the rotor and the surrounding housing of a rotary internal combustion engine, said rotor including an apex seal made in accordance with one embodiment of the present invention.

Rotatably mounted in the housing 10 is a rotor generally designated by the reference character 12, FIG. 1 showing a portion 13 of one of the apices of said rotor. Said rotor is conventionally provided with transversely disposed apex seals 14 which extend outwardly from the rotor apices to contact the inner surface of the housing 10 and thereby isolate from each other the usual combustion chambers formed by the cooperative relationship between said rotor and its surrounding housing.

It is well known that the wiping engagement between the rotor housing and the rotor apex seals causes said seals to become worn and, eventually, it is necessary to replace such seals. However, at the present time, there is no way of determining the seal wear without a costly dismantling of the engine, and by means of the present invention, there is provided a mechanism enabling the car owner, himself, quickly to determine the accumulated wear on the seals or the remaining life thereof without resorting to such dismantling.

Figure 2:
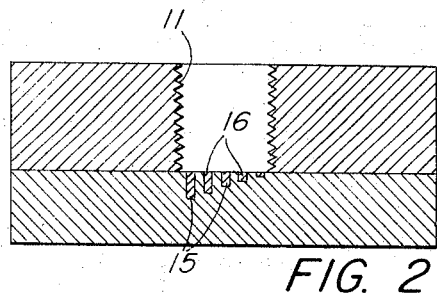
FIG. 2 is a longitudinal sectional view of the apex seal shown in FIG. 1.

One way of accomplishing this, illustrated in FIGS. 1 and 2 of the drawings, is to provide one or more of the seals with one or more openings 15 across the top thereof. If more than one, the openings extend inwardly from the seal wearing surface to different depths, varying, for example, in discrete equal increments of 0.020 inch or 0.040 inch, or more or less, selected by the seal manufacturer in accordance with the number of openings and the maximum permissible wear. If only one opening is provided, it extends inwardly from the wearing surface to the maximum permissible wear depth, for example, 0.100 inch. Preferably, but not necessarily, these openings are filled with plastic, metal or other filler material which is compatible with the material of the seal and, preferably, in order to be readily observable, of a color contrasting with the color of the material of the seal.

With such an arrangement, all that needs to be done by the car owner to determine accumulated seal wear is to remvoe one of the spark plugs from the engine and, after aligning one of the rotor apices with the spark plug socket, sight through the socket and observe the number of openings still remaining. For example, assuming that the seal was originally provided with five filled openings varying in depth by 0.020 inch, for a total permissible wear of 0.100 inch, and only one of such openings could be seen, the owner would know that the seal has already become worn by at least 0.080 inch and that there remains not more than 0.020 inch before replacement will be necessary.

Figure 4:
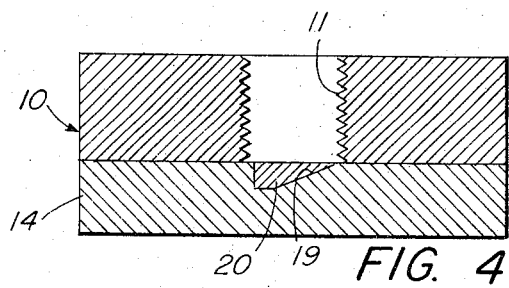
FIGS. 3, 4 and 5 are views similar to FIG. 2, but showing three different modifications of said apex seal.
Figure 3:
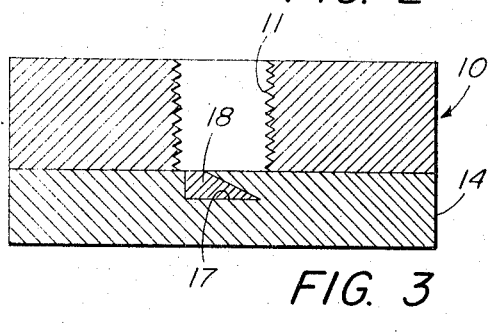
Figure 5:
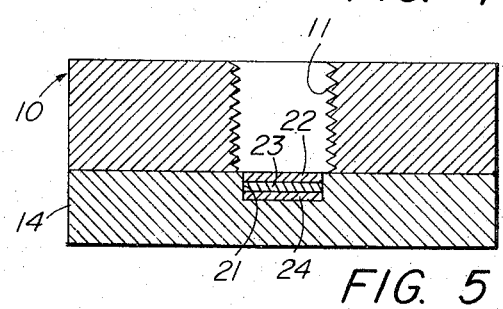

This completes the description of the first embodiment of the present invention and its method of use, and attention is now directed to the modifications shown in FIGS. 3, 4 and 5 of the drawings.

In FIG. 3, the apex seal is provided with an opening 17 which is tapered from top to bottom and becomes transversely longer with increased depth, its maximum depth corresponding to maximum permissible wear. As with the embodiment of FIGS. 1 and 2, this opening may or may not be provided with a filler 18 which, if so provided, can be molded into the seal or inserted through the underside of the seal. As the seal wears, the visible insert would become wider until, at maximum permissible wear, it would disappear.

In the embodiment of FIG. 4, an opening 19 is the reverse of the opening 17 of FIG. 3, that is, its width decreases with depth and less and less of the filler 20, if such a filler is provided, would be observable with increasing wear until it, too, would disappear at maximum permissible wear.

In the embodiment of FIG. 5, the seal 14 is provided with a transversely disposed rectangular opening 21 and there is set into said opening a stack, here shown as three, of rectangular inserts 22, 23 and 24. These inserts may be of different colors, for example, green at the top, yellow in the center and red at the bottom. The color of the observable insert would indicate the degree of wear and when the bottom insert had disappeared, one would know that maximum permissible wear had been reached.

This completes the description of the apex seal wear indicators of the present invention, including the mode of operation thereof. It will be noted from all of the foregoing that by means of the present invention, a car owner is enabled, himself, to monitor the wear of the apex seals of the rotor of a rotary internal combustion engine and quickly determine when it becomes necessary to replace such seals.

What is claimed is:

1. A mechanism for determining the apex seal wear of the rotor of a rotary internal combustion engine comprising: means, incorporated in the wearing surface of said apex seal, for indicating the accumulated wear thereof; said means being so located in said apex seal that, upon removal of one of the engine spark plugs and aligning said apex seal with the resulting hole in the rotor housing, said means becomes visible through said hole.

2. The mechanism of claim 1, wherein said means comprises an opening formed in said apex seal and extending from the wearing surface thereof to a depth corresponding to the maximum permissible wear of said apex seal.

3. The mechanism of claim 1, wherein said means comprises a plurality of aligned openings formed in said apex seal; said openings extending from the wearing surface of said apex seal to discretely different depths therein corresponding to different degrees of wear; the deepest of said openings corresponding to the maximum permissible wear; and the observable successive disappearance of said openings indicating the accumulated wear of said apex seal.

4. The mechanism of claim 1, wherein said means comprises an opening formed in said apex seal and extending from the wearing surface thereof to a depth corresponding to the maximum permissible wear of said apex seal; said opening being provided with a filler material which is compatible with and of contrasting color to the material of said apex seal, whereby the observable change in the appearance of said filler material indicates the wear of said apex seal.

5. The mechanism of claim 1, wherein said means comprises a plurality of openings formed in said apex seal; said openings extending from the wearing surface of said apex seal to discretely different depths therein corresponding to different degrees of wear; the deepest of said openings corresponding to the maximum permissible wear; each of said openings being provided with a filler material which is compatible with and of contrasting color to the material of said seal, whereby the observable successive disappearance of the filler material of each of said openings indicates the wear of said apex seal.

6. The mechanism of claim 2, wherein a cross-sectional dimension of said opening varies from the top to the bottom thereof, and the observable change of said dimension with apex seal wear indicates the extent of said wear.

7. The mechanism of claim 2, wherein a cross-sectional dimension of said opening varies uniformly from the top to the bottom thereof, with the greatest dimension at the top and the smallest dimension at the bottom, whereby the observable decrease in said dimension indicates the extent of said wear.

8. The mechanism of claim 2, wherein a cross-sectional dimension of said opening varies uniformly from the top to the bottom thereof, with the smallest dimension at the top and the greatest dimension at the bottom, whereby the observable increase in said dimension indicates the extent of said wear.

9. The mechanism of claim 2, wherein said opening is provided with a stack of discrete filler inserts which are of contrasting color to each other and to the material of said apex seal, whereby the observable successive disappearance of said filler inserts indicates the wear of said apex seal.

* * * * *